(12) United States Patent  
Araki et al.

(10) Patent No.: US 9,773,596 B2  
(45) Date of Patent: Sep. 26, 2017

(54) POWDER FOR MAGNETIC CORE AND POWDER MAGNETIC CORE

(71) Applicants: Hikaru Araki, Mie (JP); Norikazu Muneda, Mie (JP); Eiichirou Shimazu, Mie (JP)

(72) Inventors: Hikaru Araki, Mie (JP); Norikazu Muneda, Mie (JP); Eiichirou Shimazu, Mie (JP)

(73) Assignee: NTN CORPORATION, Osaka (JP)

( * ) Notice: Subject to any disclaimer, the term of this patent is extended or adjusted under 35 U.S.C. 154(b) by 516 days.

(21) Appl. No.: 14/374,976

(22) PCT Filed: Feb. 4, 2013

(86) PCT No.: PCT/JP2013/052462  
§ 371 (c)(1),  
(2) Date: Jul. 28, 2014

(87) PCT Pub. No.: WO2013/118677  
PCT Pub. Date: Aug. 15, 2013

(65) Prior Publication Data  
US 2014/0368304 A1  Dec. 18, 2014

(30) Foreign Application Priority Data

Feb. 6, 2012 (JP) ................................. 2012-023187  
Nov. 14, 2012 (JP) ................................. 2012-250347  
Jan. 31, 2013 (JP) ................................. 2013-017017

(51) Int. Cl.  
*H01F 1/24* (2006.01)  
*H01F 1/20* (2006.01)  
(Continued)

(52) U.S. Cl.  
CPC ................. *H01F 1/20* (2013.01); *B22F 1/02* (2013.01); *H01F 1/24* (2013.01); *H01F 3/08* (2013.01);  
(Continued)

(58) Field of Classification Search  
None  
See application file for complete search history.

(56) References Cited

U.S. PATENT DOCUMENTS 2,791,561 A 5/1957 Beller et al.  
3,498,918 A 3/1970 Copp  
(Continued)

FOREIGN PATENT DOCUMENTS

CN 1321991 11/2001  
GB 1146716 * 6/1966  
(Continued)

OTHER PUBLICATIONS

Office Action issued Nov. 18, 2016 in corresponding Japanese Application No. 2013-017017, with English translation.  
(Continued)

*Primary Examiner* — Jessee Roe  
*Assistant Examiner* — Ngoclan T Mai  
(74) *Attorney, Agent, or Firm* — Wenderoth, Lind & Ponack, L.L.P.

(57) ABSTRACT

Provided is a powder for a magnetic core (1), including a soft magnetic metal powder (2); and an insulating coating film (3) covering a surface of the soft magnetic metal powder (2), in which the insulating coating film (3) is formed of an aggregate of crystals (4) obtained by cleaving a layered oxide. The crystals (4) are obtained by, for example, cleaving a swellable smectite-group mineral, which is one kind of swellable layered clay mineral as the layered oxide.

17 Claims, 5 Drawing Sheets

(51) Int. Cl.

| | | |
|---|---|---|
| *B22F 1/02* | (2006.01) | |
| *H01F 27/255* | (2006.01) | |
| *H01F 41/02* | (2006.01) | |
| *H01F 3/08* | (2006.01) | |
| *H02K 1/02* | (2006.01) | |

(52) U.S. Cl.
CPC ....... *H01F 27/255* (2013.01); *H01F 41/0246* (2013.01); *H02K 1/02* (2013.01); *B22F 2998/10* (2013.01); *C22C 2202/02* (2013.01)

(56) References Cited

U.S. PATENT DOCUMENTS

| | | | |
|---|---|---|---|
| 2002/0097124 | A1 | 7/2002 | Inoue et al. |
| 2003/0077448 | A1* | 4/2003 | Ueta ................... H01F 41/0246 428/403 |
| 2007/0144614 | A1* | 6/2007 | Lu ......................... B22F 1/0059 148/105 |
| 2010/0266861 | A1 | 10/2010 | Tajima et al. |
| 2011/0024671 | A1* | 2/2011 | Otsuki ..................... B22F 1/02 252/62.54 |
| 2011/0175013 | A1 | 7/2011 | Takahashi et al. |
| 2011/0262294 | A1* | 10/2011 | Andersson .......... C22C 33/0228 419/10 |
| 2014/0085039 | A1 | 3/2014 | Ye et al. |

FOREIGN PATENT DOCUMENTS

| | | |
|---|---|---|
| GB | 1 216 486 | 12/1970 |
| JP | 2000-3810 | 1/2000 |
| JP | 2001-85211 | 3/2001 |
| JP | 2005-187918 | 7/2005 |
| JP | 2005-272956 | 10/2005 |
| JP | 2005-340290 | 12/2005 |
| JP | 2008-004864 | 1/2008 |
| JP | 2008-4864 | 1/2008 |
| JP | 2010-43361 | 2/2010 |
| JP | 4589374 | 12/2010 |
| JP | 2011-105990 | 6/2011 |
| WO | 2010/038441 | 4/2010 |
| WO | 2012/084801 | 6/2012 |

OTHER PUBLICATIONS

Office Action issued May 31, 2016 in corresponding Chinese Patent Application No. 201380007089.8 (partial English translation).
International Search Report issued Mar. 5, 2013 in International (PCT) Application No. PCT/JP2013/052462.
International Preliminary Report on Patentability and Written Opinion of the International Searching Authority issued Aug. 21, 2014 in International Application No. PCT/JP2013/052462.
Extended European Search Report issued Jun. 1, 2015 in corresponding European Application No. 13747321.1.

* cited by examiner

| | (1)Density | (2)Electric Resistivity of Insulating Coating Film | (3)Electric Resistivity of Test Piece | Evaluation Point | | | | | Total Point of (4) to (8) |
|---|---|---|---|---|---|---|---|---|---|
| | | | | (4)Magnetic Flux Density | (5)Maximum Magnetic Permeability | (6)Iron Loss | (7)Radial Crushing Strength | (8)Rattler Value | |
| Example 1 | 4 | 4 | 2 | 4 | 3 | 3 | 5 | 3 | 18 |
| Example 2 | 3 | 4 | 2 | 3 | 3 | 3 | 5 | 3 | 17 |
| Example 3 | 3 | 4 | 2 | 3 | 3 | 3 | 5 | 3 | 17 |
| Example 4 | 3 | 4 | 2 | 3 | 3 | 3 | 5 | 3 | 17 |
| Example 5 | 2 | 4 | 3 | 2 | 2 | 3 | 4 | 2 | 13 |
| Example 6 | 3 | 4 | 2 | 3 | 3 | 3 | 4 | 2 | 14 |
| Example 7 | 4 | 4 | 2 | 3 | 3 | 2 | 5 | 3 | 16 |
| Example 8 | 2 | 4 | 2 | 2 | 2 | 2 | 4 | 2 | 12 |
| Example 9 | 2 | 4 | 2 | 2 | 2 | 3 | 3 | 2 | 12 |
| Example 10 | 2 | 4 | 2 | 2 | 2 | 3 | 3 | 2 | 12 |
| Example 11 | 3 | 4 | 2 | 3 | 2 | 3 | 4 | 2 | 14 |
| Example 12 | 4 | 4 | 3 | 3 | 2 | 2 | 3 | 2 | 12 |
| Example 13 | 4 | 4 | 4 | 4 | 3 | 4 | 5 | 3 | 19 |
| Example 14 | 4 | 4 | 2 | 4 | 3 | 4 | 5 | 3 | 19 |
| Example 15 | 4 | 4 | 3 | 4 | 3 | 5 | 5 | 3 | 20 |
| Example 16 | 3 | 4 | 3 | 4 | 3 | 5 | 5 | 4 | 21 |
| Example 17 | 4 | 4 | 3 | 4 | 3 | 4 | 5 | 3 | 19 |
| Example 18 | 3 | 4 | 3 | 4 | 3 | 4 | 5 | 3 | 19 |
| Example 19 | 4 | 4 | 3 | 4 | 3 | 4 | 5 | 3 | 19 |
| Example 20 | 4 | 4 | 4 | 4 | 3 | 6 | 5 | 3 | 21 |
| Example 21 | 4 | 4 | 3 | 4 | 3 | 5 | 5 | 3 | 20 |
| Example 22 | 4 | 4 | 3 | 4 | 3 | 5 | 5 | 3 | 20 |
| Comparative Example 1 | 1 | 3 | 1 | 1 | 1 | 1 | 1 | 1 | 5 |
| Comparative Example 2 | 1 | 3 | 1 | 1 | 1 | 1 | 1 | 1 | 5 |
| Comparative Example 3 | 1 | 3 | 1 | 1 | 1 | 1 | 1 | 1 | 5 | ns
POWDER FOR MAGNETIC CORE AND POWDER MAGNETIC CORE

TECHNICAL FIELD

The present invention relates to a powder for a magnetic core and a powder magnetic core.

BACKGROUND ART

As is well known, for example, a power source circuit, which is used by being incorporated into, for example, an electric product and a mechanical product, is mounted with a transformer, a step-up transformer, a rectifier, and the like. The transformer and the like include various coil components each formed of a magnetic core and a winding as main parts, such as a choke coil, a power inductor, and a reactor. In order to respond to a request for low power consumption with respect to the electric product and the mechanical product on the background of increasing consciousness of energy saving in recent years, there is a demand for improvements in magnetic characteristics of the magnetic core to be used frequently in the power source circuit and a reduction in magnetic loss of the magnetic core. Further, in recent years, with increasing consciousness of a global warming issue, there has been an increasing demand for a hybrid electric vehicle (HEV), which can suppress consumption of fossil fuel, and an electric vehicle (EV), which does not directly consume fossil fuel. Running performance and the like of the HEV and the EV depend on performance of a motor. Therefore, there is also a demand for improvements in magnetic characteristics and reduction in magnetic loss of a magnetic core (a stator core or a rotor core) to be incorporated into various motors.

Hitherto, as the magnetic core, a so-called laminated magnetic core in which steel plates (magnetic steel plates) whose surface is covered with an insulating coating film are laminated through intermediation of an adhesive layer has been widely used. However, such laminated magnetic core has a low degree of freedom of a shape and is difficult to respond to a request for miniaturization and a complicated shape. Thus, there has been developed a so-called powder magnetic core obtained by subjecting a soft magnetic metal powder (metal powder having a small coercive force and a large magnetic permeability, which is generally a metal powder containing iron as a main component) whose surface is covered with an insulating coating film to compression molding. The powder magnetic core has been mounted on various products.

Meanwhile, as one of the effective means for improving the magnetic characteristics of the magnetic core, there is given means for decreasing the coercive force of the magnetic core. This is because, when the coercive force is decreased, a magnetic permeability increases whereas a hysteresis loss (iron loss) decreases. The coercive force of the powder magnetic core depends on, for example, a particle diameter, impurity content, and strain amount of the soft magnetic metal powder forming a powder for molding into a powder magnetic core (hereinafter referred to as "powder for a magnetic core"). As one of the effective means for easily obtaining a powder magnetic core having a small coercive force, there is given means for removing a strain (crystal strain) accumulated in the soft magnetic metal powder during powder production, during compression molding into a compact, and the like. In order to properly remove the strain, it is necessary to heat the compact at a recrystallization temperature or more of the soft magnetic metal powder (metal) for a predetermined period of time. For example, in the case of molding a powder for a magnetic core including a pure iron powder and an insulating coating film covering a surface of the pure iron powder into a compact, it is necessary to heat the compact at 600° C. or more, preferably 650° C. or more, more preferably 700° C. or more. Note that, a heating temperature and heating time of the compact are appropriately adjusted depending on a purity of the soft magnetic metal powder to be used and the like.

Thus, the insulating coating film for covering the surface of the soft magnetic metal powder desirably has high heat resistance. The reason for this is as described below. When the heat resistance of the insulating coating film is insufficient, the insulating coating film is damaged, decomposed, peeled, and the like along with heating treatment, and hence the heating treatment cannot be performed at high temperature at which the strain accumulated in the soft magnetic metal powder can be removed properly. As specific examples of the insulating coating film having high heat resistance, there are known an insulating coating film having a two-layered structure formed of a high-resistance substance and a phosphate-based chemically treated coating film covering the surface of the high-resistance substance (Patent Literature 1), an insulating coating film formed of an alkoxide coating film made of an Al—Si—O-based composite oxide and a silicone resin coating film formed on the alkoxide coating film (Patent Literature 2), an insulating coating film formed of an insulating layer of at least one kind selected from an oxide, a carbonate, and a sulfate, and a silicone resin layer formed on the insulating layer (Patent Literature 3), and the like.

CITATION LIST

Patent Literature 1: JP 2001-85211 A
Patent Literature 2: JP 4589374 B2
Patent Literature 3: JP 2010-43361 A

SUMMARY OF INVENTION

Technical Problem

However, in the powder for a magnetic core having an insulating coating film disclosed in Patent Literatures 1 to 3, it is difficult to obtain a powder magnetic core, in particular, having a high magnetic flux density for the following reason. The magnetic flux density of a powder magnetic core increases as the density of the powder magnetic core increases. However, in the case where the insulating coating film has a two-layered structure as described above, the thickness of the insulating coating film is likely to be large, and molding into a powder magnetic core (compact) at a high density becomes difficult accordingly. Further, it is not easy to strictly control the thickness of a phosphate-based chemically treated coating film or a silicone coating film, and it is much more difficult to control the thickness at a nano-order level as requested in recent years. Further, when the insulating coating film has a two-layered structure, it takes much labor for forming a coating film, which causes an increase in cost of a powder for a magnetic core and a powder magnetic core.

In view of the above-mentioned circumstances, main object of the present invention is to provide a powder for a magnetic core, comprising a soft magnetic metal powder and an insulating coating film covering a surface of the soft magnetic metal powder, which enables the low-cost production of an insulating coating film capable of exhibiting high heat resistance and insulating performance even with a small thickness and enables the low-cost production of a powder magnetic core excellent in magnetic characteristics.

Solution to Problem

The inventors of the present invention earnestly conducted studies. As a result, the inventors of the present invention paid attention to various characteristics of crystals forming a layered oxide and found that an insulating coating film capable of exhibiting high heat resistance and insulating performance even with a small thickness can be formed at low cost through use of the crystals forming a layered oxide as a material for forming an insulating coating film, thereby achieving the present invention.

That is, a powder for a magnetic core according to the present invention devised for achieving the above-mentioned object comprises: a soft magnetic metal powder; and an insulating coating film covering a surface of the soft magnetic metal powder, in which the insulating coating film comprises an aggregate of crystals obtained by cleaving a layered oxide. Note that, the phrase "crystals formed by cleaving a layered oxide" as used herein is used synonymously with the phrase "crystals forming a layered oxide and cleaved (separated) from the layered oxide."

The layered oxide is formed of a laminate of crystals having a negative charge through intermediation of alkali metal cations or alkaline earth metal cations, and in the atmosphere (or in the case where stirring is not performed in an aqueous solution), the negative charge of the crystals is neutralized with the metal cations interposed between the crystals, whereby the balance of charges, that is, the laminate structure of the crystals and the metal cations is kept in a stable state. On the other hand, for example, when a layered oxide (in particular, a swellable layered clay mineral described later) is soaked in an appropriate solvent and stirred, a solution is obtained in which crystals forming the layered oxide are dispersed in the solvent while being cleaved in a unit layer. That is, when a layered oxide (in particular, a swellable layered clay mineral described later) is soaked in an appropriate solvent and stirred, a solution is obtained in which crystals having a negative charge and metal cations having a positive charge are dispersed while being separated completely. Therefore, when a soft magnetic metal powder is soaked in the above-mentioned solution, the crystals (having a negative charge) dispersed in the solution are successively deposited (accumulated) on the surface of the soft magnetic metal powder.

Then, the crystals obtained by cleaving a layered oxide have a high volume resistivity. Therefore, when the crystals are deposited on the surface of a soft magnetic metal powder, an aggregate of the deposited crystals can form an insulating coating film. The decomposition temperature of the crystals is as high as about 700° C. or more. Further, the crystals each have a plate shape in which an aspect ratio (=length/thickness) calculated by dividing the length (maximum diameter) by the thickness is at least 25 or more, and the thickness is stably kept at from about 1 to several nm. From the above, when an insulating coating film is formed of an aggregate of crystals obtained by cleaving a layered oxide, the insulating coating film having high heat resistance and insulating performance even with a small thickness is small can be formed with good accuracy. Thus, according to the present invention, a powder for a magnetic core can be produced easily at low cost, in which the surface of a soft magnetic metal powder is covered with an insulating coating film capable of exhibiting high heat resistance and insulating performance even with a small thickness.

Note that, as a method that may be adopted for cleaving crystals forming a layered oxide, for example, a method involving applying a mechanical force to a layered oxide can be considered, besides the method involving soaking a layered oxide in an appropriate solvent, followed by stirring, as described above. Further, in the case of depositing crystals (forming an insulating coating film) on the surface of a soft magnetic metal powder by the above-mentioned method, crystals in an amount greater than necessary are deposited and accumulated on the surface of a metal powder, depending on the soaking time of the metal powder in the above-mentioned solution, the concentration of the solution, and the like. Even in such case, crystals ionically bonded to cations of an alkali metal, an alkaline earth metal, or the like are cleaved easily in a state in which a solvent is present, and hence the crystals can be easily removed, as compared to crystals ionically bonded to a soft magnetic metal powder. Therefore, in the case where crystals are deposited and accumulated in an amount greater than necessary, the laminated crystals are subjected to delamination to reduce the thickness of an insulating coating film, for example, merely by exposing the crystals to running water. That is, according to the configuration of the present invention, the thickness of an insulating coating film can be controlled easily with good accuracy, and hence there is also an advantage in that an insulating coating film having a small thickness and less variation in thickness can be obtained easily.

An insulating coating film may be formed of an aggregate of one kind of crystals and may also be formed of an aggregate of a plurality of kinds of crystals. In particular, when an insulating coating film is formed of an aggregate of a plurality of kinds of crystals having different aspect ratios (=length/thickness) calculated by dividing the length (length of a crystal) by the thickness (thickness of a crystal), gaps between adjacent crystals can be reduced. Therefore, a dense insulating coating film, that is, an insulating coating film excellent in insulating performance is likely to be obtained. Note that, such insulating coating film can be formed, for example, by soaking two kinds of layered oxides (for example, hectorite and saponite described later) having different aspect ratios in an appropriate solvent, followed by stirring, to obtain a solution in which two kinds of crystals are dispersed while being cleaved in a unit layer, thereafter soaking a soft magnetic metal powder in this solution, and successively depositing crystals dispersed in the solution on the surface of the soft magnetic metal powder (strictly, further removing a liquid component of the solution).

In the above-mentioned configuration, as an example of a layered oxide that can be preferably used, there can be given a swellable layered clay mineral formed of a laminate of crystals of a silicate. That is, an insulating coating film can be formed of an aggregate of crystals obtained by cleaving a swellable layered clay mineral. Note that, as the layered oxide, for example, a layered titanic acid compound formed of a laminate of crystals of titanium oxide having insulating property may also be used instead of the swellable layered clay mineral.

Of the swellable layered clay minerals, a swellable smectite-group mineral, which is a cation-exchange type swellable layered clay mineral, or a swellable mica-group mineral can be preferably used as a material for forming an insulating coating film. Of the swellable smectite-group mineral and the swellable mica-group mineral, minerals containing monovalent metal cations interposed between crystals are particularly preferred because of excellent swellability. Specific examples of the swellable smectite-group mineral that may be preferably used may include hectorite, montmorillonite, saponite, stevensite, beidellite, nontronite, and bentonite. In addition, specific examples of the swellable mica-group mineral that may be preferably used may include Na-type tetrasilicic fluormica, Li-type tetrasilicic fluormica, Na-type fluortaeniolite, Li-type fluortaeniolite, and vermiculite.

An insulating coating film covering the surface of a soft magnetic metal powder becomes more advantageous for obtaining a powder magnetic core excellent in magnetic characteristics, as the thickness thereof is smaller and the structure thereof is denser. From such viewpoint, it is preferred that the crystal have a thickness of 1 nm or less and a length (maximum diameter) of 50 nm or less. Such crystal can be obtained by cleaving, in particular, the swellable smectite-group mineral out of the layered oxides.

The various crystals described above generally have a weak positive charge at ends. As the crystals, there may be given those which are obtained by cleaving a swellable layered clay mineral (in particular, a swellable smectite-group mineral) and in which at least part of a hydroxyl group (—OH group) at an end is substituted by a fluoro group (—F group). The fluoro group has a high electronegativity as compared to that of the hydroxyl group, and hence the crystal in which at least part of a hydroxyl group at an end is substituted by a fluoro group has a positive charge at the end (end face) thereof weakened. Therefore, such crystal can suppress a repulsive force between adjacent crystals, and hence it becomes easy to form a dense insulating coating film in which gaps between adjacent crystals are small. Note that, such functional effect can be effectively exhibited in particular in the case of using a crystal in which the substitution amount of the hydroxyl group by the fluoro group is 0.05 mol or more and 0.3 mol or less when the content of silicon is defined as 1 mol.

Further, the crystal may be a crystal that is obtained by cleaving a swellable layered clay mineral (in particular, a swellable smectite-group mineral) and has a structure in which a hydroxyl group (—OH group) at an end is condensed with a metal alkoxide. With this, gaps formed between adjacent crystals can be reduced in size, and hence an insulating coating film having a dense structure can be obtained. Therefore, with such powder for a magnetic core, a powder magnetic core capable of preventing an eddy current from flowing between adjacent particles as much as possible, that is, a powder magnetic core having a small loss of an eddy current can be obtained. Examples of the metal alkoxide may include $Si(OR)_4$, $Al(OR)_4$, and $B(OR)_4$.

Further, the crystal may be a crystal obtained by cleaving a swellable layered clay mineral (in particular, a swellable smectite-group mineral) in which at least part of an end thereof has an anion bonded thereto. When at least part of the end of the crystal has an anion bonded thereto, the electric neutrality of the crystal is enhanced. Thus, such crystal can suppress adjacent crystals from repelling each other and facilitates the formation of a dense insulating coating film. Examples of the anion that may be bonded to the end of the crystal may include a sulfide ion, a nitrate ion, a tetrasodium pyrophosphate ion, and a sodium silicate ion as well as a high-concentration phosphate, a glycol, and a nonionic surfactant.

In the powder for a magnetic core having the above-mentioned configuration, the insulating coating film may be formed so as to further contain a zirconium compound. With this configuration, an insulating coating film further excellent in heat resistance can be obtained. Examples of the zirconium compound that may be used may include zirconia ($ZrO_2$), zircon ($ZrSiO_4$), and a zirconium organic metal compound.

In the powder for a magnetic core having the above-mentioned configuration, the soft magnetic metal powder can be used without any problems irrespective of a production method by which the soft magnetic metal powder is produced. Specifically, various metal powders produced by known production methods, such as a reduced powder produced by a reduction method, an atomized powder produced by an atomizing method, and an electrolytic powder produced by an electrolytic method, can be used. Note that, of those, an atomized powder, which has a relatively high purity, is excellent in removal property of a strain, and is excellent in moldability, is desirably used for the following reasons. As the purity becomes higher, the recrystallization temperature decreases and the removal property of a strain is enhanced. Therefore, a powder magnetic core having a small coercive force is likely to be obtained. Further, as the moldability becomes more excellent, a compact having a high density, and a powder magnetic core having a high magnetic flux density can be obtained more easily.

When a soft magnetic metal powder having a small particle diameter of less than 30 μm is used as the soft magnetic metal powder, the flowability of the powder in a molding die (cavity) decreases, which makes it difficult to obtain a powder magnetic core having a high density, and further a hysteresis loss (iron loss) of a powder magnetic core increases. On the other hand, when a soft magnetic metal powder having a large particle diameter of more than 300 μm is used as the soft magnetic metal powder, an eddy current loss (iron loss) of a powder magnetic core increases. Thus, from the viewpoint of obtaining a powder magnetic core having a high magnetic flux density and a small iron loss, a soft magnetic metal powder having a particle diameter of 30 μm or more and 300 μm or less is preferably used as the soft magnetic metal powder. Note that, the term "particle diameter" as used herein refers to a number average particle diameter (the same applies to the following).

It is desired that the thickness of the insulating coating film be small so as to increase the magnetic flux density of a powder magnetic core obtained by subjecting the powder for a magnetic core to compression molding or the like (so as to enable high-density molding into a compact), as long as an eddy current can be effectively prevented from flowing between adjacent powders for a magnetic core (metal powders). Thus, the thickness of the insulating coating film is desirably 1 nm or more and 500 nm or less, more desirably 1 nm or more and 100 nm or less, still more desirably 1 nm or more and 20 m or less. Note that, as described above, the thickness of the insulating coating film can be controlled easily according to the configuration of the present invention.

A powder magnetic core to be obtained by heating a compact of a raw material powder containing any one of the powders for a magnetic core described above as a main component is excellent in magnetic characteristics. This is because the insulating coating film forming the powder for a magnetic core is formed of an aggregate of crystals excellent in heat resistance having a decomposition temperature of 700° C. or more, and hence even when heating treatment is performed at high temperature (equal to or more than the recrystallization temperature of a soft magnetic metal) at which the strain accumulated in the soft magnetic metal powder can be removed properly, the insulating coating film is not damaged, decomposed, or peeled, for example. Further, the crystal forming the insulating coating film is bonded to an adjacent crystal through a condensation reaction, when heated at a predetermined temperature (temperature substantially equal to the recrystallization temperature of a soft magnetic metal) or more. Thus, when the compact is heated at an appropriate temperature or more, a powder magnetic core excellent in various strengths (mechanical strength, chipping resistance, etc.) as well as magnetic characteristics can be obtained.

When the powder magnetic core is increased in relative density to 93% or more, the versatility of the powder magnetic core is enhanced because the magnetic characteristics and further mechanical strength and chipping resistance of the powder magnetic core are enhanced sufficiently. The relative density as used herein is represented by the following relational expression.

Relative density=(Density of entire powder magnetic core/True density)×100[%]

Note that, the true density refers to a theoretical density in the case where no pores are present inside a raw material.

As the raw material powder for obtaining the powder magnetic core (compact), the powder for a magnetic core mixed with an appropriate amount of a solid lubricant can be used. When an appropriate amount of a solid lubricant is mixed with the powder for a magnetic core, the friction between the powders for a magnetic core can be reduced during molding into the compact. Therefore, the damage, peeling, and the like of the insulating coating film can also be prevented as much as possible, in addition to the ease of obtaining a compact having a high density. Specifically, it is desired that a raw material powder containing 0.3 to 7 vol % of a solid lubricant, with the balance being a powder for a magnetic core, be used.

The powder magnetic core into which the powder for a magnetic core according to the present invention is molded has a high degree of freedom of a shape and is excellent in magnetic characteristics and various strengths. Therefore, the powder magnetic core can be preferably used as a magnetic core for a motor for vehicles typified by automobiles and railroad vehicles or as a magnetic core for power source circuit components such as a choke coil, a power inductor, and a reactor.

Advantageous Effects of Invention

As described above, according to one embodiment of the present invention, the powder for a magnetic core, including a soft magnetic metal powder and an insulating coating film covering the surface of the soft magnetic metal powder, which enables the formation of an insulating coating film capable of exhibiting high heat resistance and insulating performance even with a small thickness, can be provided. This enables a powder magnetic core excellent in magnetic characteristics and various strengths to be obtained at low cost.

BRIEF DESCRIPTION OF DRAWINGS

FIG. 1b is a view schematically illustrating a production step of the powder for a magnetic core illustrated in FIG. 1a.

FIG. 6 is a table showing production conditions for each ring-shaped test body used in a confirmation test.

FIG. 7 is a table showing test results of the confirmation test.

DESCRIPTION OF EMBODIMENTS

Hereinafter, embodiments of the present invention are described with reference to the drawings.

Figure 1A:
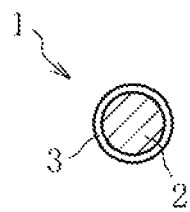
FIG. 1a is a view schematically illustrating a powder for a magnetic core according to the present invention.

A powder for a magnetic core 1 according to the present invention includes a soft magnetic metal powder 2 and an insulating coating film 3 covering the surface of the soft magnetic metal powder 2, as illustrated in FIG. 1a. The insulating coating film 3 is formed of an aggregate of crystals 4 forming a layered oxide and cleaved (separated) from the layered oxide (see FIG. 1c). The powder for a magnetic core 1 is a powder for molding into a powder magnetic core, for example, a stator core 20 (see FIG. 4) to be used, for example, by being incorporated into a stator of a motor. A powder magnetic core 6 (see FIG. 3b) is produced mainly through a powder production step of generating the powder for a magnetic core 1, a compression molding step of obtaining a compact of the powder for a magnetic core 1, and a heating step of subjecting the compact to heating treatment successively. Hereinafter, each step is described in detail with reference to the drawings.

[Powder Production Step]

Figure 1B:
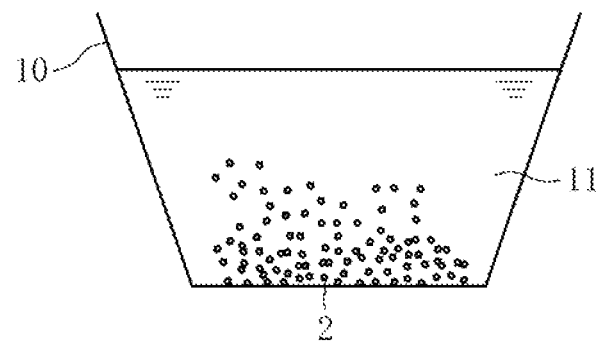

FIG. 1b schematically illustrates an example of the powder production step of generating the powder for a magnetic core 1 illustrated in FIG. 1a. The powder production step involves soaking a soft magnetic metal powder 2 in a solution 11 containing a material for forming the insulating coating film 3 filling a container 10, and performing drying treatment for removing a liquid component of the solution 11 adhering to the surface of the soft magnetic metal powder 2, thereby obtaining the powder for a magnetic core 1 including the soft magnetic metal powder 2 and the insulating coating film 3 covering the surface of the soft magnetic metal powder 2. Note that, as the thickness of the insulating coating film 3 increases, it becomes more difficult to obtain the compact 5 (see FIG. 3a) having a high density, and the powder magnetic core 6 having high magnetic characteristics (in particular, magnetic permeability). On the other hand, as the thickness of the insulating coating film 3 decreases, the magnetic permeability of the powder magnetic core 6 can be enhanced more, but when the thickness of the insulating coating film 3 is too small, the insulating coating film 3 is damaged and the like when the powder for a magnetic core 1 is compressed during the compression molding step. As result, an eddy current is liable to flow between the powders for a magnetic core 1 (soft magnetic metal powders 2) adjacent to each other. Therefore, the thickness of the insulating coating film 3 is preferably 1 nm or more and 500 nm or less, more preferably 1 nm or more and 100 nm or less, still more preferably 1 nm or more and 20 nm or less.

As the soft magnetic metal powder 2, an iron powder having a purity of 97% or more is preferably used, and a pure iron powder is more preferably used, because it is more advantageous to obtain a powder magnetic core having a small coercive force as the purity of the soft magnetic metal powder 2 increases. Note that, known other soft magnetic metal powders, for example, a silicon alloy (Fe—Si) powder, a sendust (Fe—Al—Si) powder, a permendur (Fe—Co) powder, or the like can also be used.

The soft magnetic metal powder 2 to be used may be produced by any production method. Specifically, any of a reduced powder produced by a reduction method, an atomized powder produced by an atomizing method, and an electrolytic powder produced by an electrolytic method may be used. Of those, an atomized powder, which has a relatively high purity, is excellent in removal property of a strain, and is easily molded into a compact having a high density, is preferably used. The atomized powder is roughly classified into a water atomized powder produced by a water atomizing method and a gas atomized powder produced by a gas atomizing method. The water atomized powder is excellent in moldability as compared to the gas atomized powder, and hence the compact 5 having a high density and the powder magnetic core 6 having a high magnetic flux density are likely to be obtained. Thus, in the case of using the atomized powder as the soft magnetic metal powder 2, it is preferred to select and use, in particular, the water atomized powder.

As the soft magnetic metal powder 2, a soft magnetic metal powder having a particle diameter (number average particle diameter) of 30 µm or more and 300 µm or less is used. This is because, when the soft magnetic metal powder 2 to be used has a small particle diameter of less than 30 µm, the flowability in the molding die (cavity) to be used in the compression molding step described later is degraded, and hence it becomes difficult to obtain the compact 5 having a high density and the powder magnetic core 6 having a high magnetic flux density. In addition, a hysteresis loss (iron loss) of the powder magnetic core 6 increases. Further, when the soft magnetic metal powder 2 to be used has a large particle diameter of more than 300 µm, an eddy current loss (iron loss) of the powder magnetic core 6 increases.

The solution 11 containing a material for forming the insulating coating film 3 is obtained by loading an appropriate amount of the swellable layered clay mineral out of the layered oxides into an appropriate solvent such as water or an organic solvent. Herein, the swellable layered clay mineral is a kind of phyllosilicate in which crystals of a silicate having a negative charge are laminated through intermediation of alkali metal cations or alkaline earth metal cations, and in the atmosphere or in the case where stirring is not performed in an aqueous solution, the negative charge of the crystals is neutralized with metal cations interposed between the crystals, whereby the balance of charges, that is, the laminate structure of the crystals is kept in a stable state. On the other hand, when the swellable layered clay mineral is soaked in an appropriate solvent, followed by stirring, the solution 11 in which the crystals are dispersed while being cleaved completely is obtained easily. That is, when the swellable layered clay mineral is soaked in an appropriate solvent, followed by stirring, the solution 11 in which the crystals having a negative charge and the metal cations having a positive charge are separated from each other completely is obtained.

As the swellable layered clay mineral, a swellable smectite-group mineral, which is a cation-exchange type swellable layered clay mineral, can be preferably used. The swellable smectite-group mineral is a kind of crystallized phyllosilicate in which two or more silicate layers are laminated, the silicate layers each having a sandwich-type three-layered structure in which an octahedral layer is sandwiched between tetrahedral layers of Si—O, Al—O, or the like. Typical examples of the swellable smectite-group mineral may include hectorite, montmorillonite, saponite, stevensite, beidellite, nontronite, and bentonite. Any of the illustrated swellable smectite-group minerals may be used. Of those, in the case where the insulating coating film 3 is formed of an aggregate of crystals of hectorite formed of an inorganic compound of Si, Mg, and Li, or in the case where the insulating coating film 3 is formed of an aggregate of crystals of saponite, which is a layered silicate synthesized from an inorganic compound of Si, Mg, and Al, it becomes advantageous for obtaining the powder magnetic core 6 having a small eddy current loss (iron loss). Therefore, in the case of obtaining the solution 11 by soaking and stirring the swellable smectite-group mineral in an appropriate solvent, it is preferred that at least one of hectorite and saponite be selected and used.

Further, as the swellable layered clay mineral, not only the swellable smectite-group mineral but also a swellable mica-group mineral can be preferably used. The swellable mica-group mineral is a kind of crystallized phyllosilicate in which composite layers are laminated, the composite layers each having an octahedral layer sandwiched between a pair of Si—O tetrahedral layers. Typical examples of the swellable mica-group mineral may include Na-type tetrasilicic fluormica, Li-type tetrasilicic fluormica, Na-type fluortaeniolite, Li-type fluortaeniolite, and vermiculite. Of those, a swellable mica-group mineral having a Na ion or Li ion as a cation between layers is preferably used.

Note that, the solution 11 can also be obtained through use of a layered silicate mineral having a similar structure to that of the swellable smectite-group mineral or the swellable mica-group mineral, or a substitution product, derivative, or modified product thereof, and the insulating coating film 3, and the powder magnetic core 1 can also be produced through use of the solution 11.

Note that, the crystals forming the smectite-group mineral each have a plate shape in which an aspect ratio (=length/thickness) calculated by dividing the length (maximum diameter) by the thickness is at least 25 or more, and the thickness is stable at from about 1 to several nm. Further, the crystals forming the mica-group mineral each have a plate shape in which the aspect ratio is at least 100 or more, and the thickness is stably kept at about 10 nm. As the thickness of the insulating coating film 3 covering the surface of the soft magnetic metal powder 2 is smaller and the structure thereof is denser, the powder magnetic core 6 excellent in magnetic characteristics is more likely to be obtained. Therefore, it is preferred that the crystals 4 forming the insulating coating film 3 have a thickness of 1 nm or less and a length of 50 nm or less. From such viewpoint, as the crystals 4, those which are obtained by cleaving the swellable smectite-group mineral, out of the swellable smectite-group mineral and the swellable mica-group mineral, are particularly preferably used.

Figure 1C:
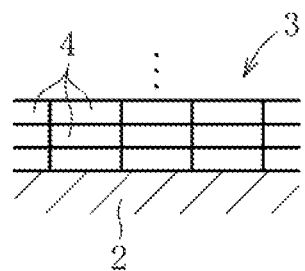
FIG. 1c is a view schematically illustrating a state in which an insulating coating film is being formed.

In addition, when the soft magnetic metal powder 2 is soaked in the solution 11 obtained as described above, the crystals 4 dispersed while being completely cleaved in the solution 11 are successively deposited and accumulated on the surface of the soft magnetic metal powder 2, as illustrated in FIG. 1c.

The crystals forming the layered oxide (swellable layered clay mineral) has high volume resistivity. Therefore, when a liquid component of the solution 11 adhering to the soft magnetic metal powder 2 is removed after the soft magnetic metal powder 2 on the surface of which the crystals 4 are deposited and accumulated is taken out from the solution 11, the insulating coating film 3 for covering the surface of the soft magnetic metal powder 2 is formed of an aggregate of the deposited crystals 4. Herein, the decomposition temperature of the crystals 4 is equal or more than a temperature (about 700° C. or more) at which the compact 5 can be subjected to heating treatment capable of appropriately removing the strain accumulated in the soft magnetic metal powder 2 forming the compact 5 in the heating step described later. Further, as described above, the crystals 4 each have a thin plate shape, and the thickness thereof is stably kept at from about several nm to 10 nm. Therefore, the insulating coating film 3 formed of an aggregate of the crystals 4 obtained by cleaving the swellable layered clay mineral has high heat resistance and insulating performance even with a small thickness. Thus, according to the present invention, the powder for a magnetic core 1, in which the surface of the soft magnetic metal powder 2 is covered with the insulating coating film capable of exhibiting high heat resistance and insulating performance even with a small thickness, can be formed easily at low cost.

The crystals 4 in an amount greater than necessary are deposited and accumulated on the surface of the soft magnetic metal powder 2, depending on the soaking time of the soft magnetic metal powder 2 in the solution 11, the concentration of the solution 11, and the like. However, the crystals 4 ionically bonded to cations of an alkali metal, an alkaline earth metal, or the like are easily cleaved in a state in which a solvent is present, and hence the crystals 4 can be easily removed, as compared to the crystals 4 ionically bonded to the soft magnetic metal powder 2. Therefore, in the case where the crystals 4 are deposited in an amount greater than necessary, the laminated crystals 4 are subjected to delamination to reduce the thickness of the insulating coating film 3, for example, merely by exposing the crystals 4 to running water. That is, according to the configuration of the present invention, the thickness of the insulating coating film 3 can be controlled easily with good accuracy, and hence there is also an advantage in that the insulating coating film 3 having a small thickness and less variation in thickness (having a substantially uniform thickness) can be obtained easily.

Note that, the insulating coating film 3 covering the surface of the soft magnetic metal powder 2 can also be formed through use of a so-called tumbling fluidized bed apparatus (also called "tumbling fluidized bed coating apparatus"). Although not shown, in the case of using the tumbling fluidized bed apparatus, the insulating coating film 3 can be formed in the following procedure. First, an indefinite number of the soft magnetic metal powders 2 are loaded into a container. Then, airstream production means for generating an airstream in the container is driven, whereby the soft magnetic metal powders 2 are stirred and fluidized while being floated in the container. With this state kept, the solution 11 (solution 11 in which the crystals 4 having a negative charge and metal cations having a positive charge are dispersed while being completely separated from each other) is sprayed into the container in a mist shape so that the solution 11 adheres to the soft magnetic metal powder 2. A liquid component such as a solvent contained in the solution 11 adhering to the soft magnetic metal powder 2 is lost with the airstream (wind), and along with this, the crystals 4 contained in the solution 11 are deposited and accumulated on the surface of the soft magnetic metal powder 2. The deposited and accumulated crystals 4 form the insulating coating film 3.

According to the above-mentioned method, the thickness of the insulating coating film 3 can be adjusted by adjusting the concentration of the solution 11 and the operation time of the tumbling fluidized bed apparatus. Therefore, the insulating coating film 3 having a small thickness can be formed with good accuracy, and the thickness of the insulating coating film 3 can be prevented from being varied between the powders for a magnetic core 1 (soft magnetic metal powders 2) as much as possible. Further, in this method, covering and drying can be performed simultaneously, and hence the insulating coating film 3 can be formed rapidly.

[Compression Molding Step]

Figure 2A:
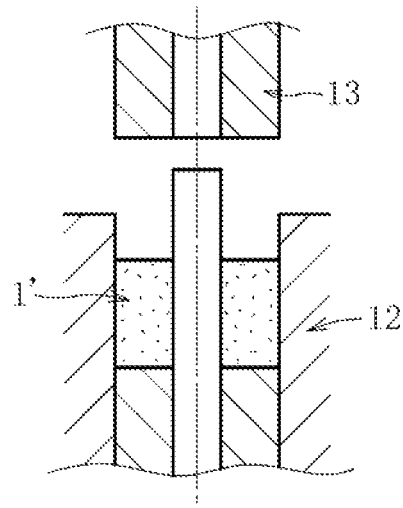
FIG. 2a is a view schematically illustrating an initial stage of a compression molding step.
Figure 2B:
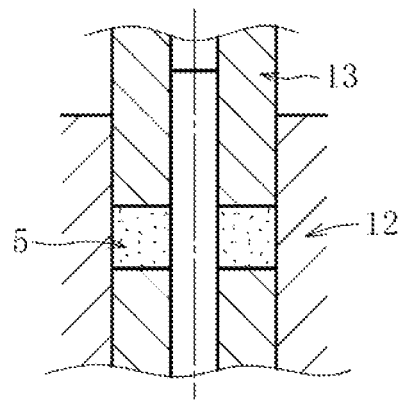
FIG. 2b is a view schematically illustrating an intermediate stage of the compression molding step.
Figure 3A:
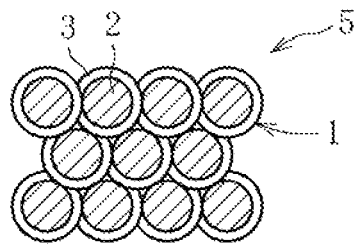
FIG. 3a is a view schematically illustrating a part of a compact to be obtained through the compression molding step.
Figure 3B:
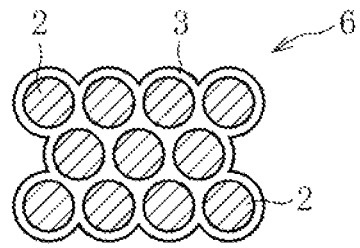
FIG. 3b is a view schematically illustrating apart of a powder magnetic core to be obtained through a heating step.

Next, in a compression molding step schematically illustrated in FIG. 2a and FIG. 2b, the compact 5 schematically illustrated in FIG. 3a is obtained by compressing a raw material powder 1' through use of a molding die having a die 12 and a punch 13 disposed coaxially. The raw material powder 1' may be formed of only the powder for a magnetic core 1 obtained in the above-mentioned powder production step. Herein, the raw material powder 1' containing an appropriate amount of a solid lubricant such as zinc stearate or stearic acid amide, with the balance being the powder for a magnetic core 1, is used. Accordingly, when the raw material powder 1' contains a solid lubricant, the friction between the powders for a magnetic core 1 can be reduced during compression molding into the compact 5. Therefore, the damage and the like of the insulating coating film 3 caused by the friction between the powders for a magnetic core 1 can also be prevented as much as possible, in addition to the ease of obtaining the compact 5 having a high density.

Note that, in the case where the blending amount of the solid lubricant occupying the raw material powder 1' is too small, specifically, in the case where the blending amount of the solid lubricant is less than 0.3 vol % when the total amount of the raw material powder 1' is defined as 100 vol %, the above-mentioned advantages exhibited by mixing the solid lubricant cannot be effectively obtained. Further, in the case where the blending amount of the solid lubricant is too large, specifically, in the case where the blending amount of the solid lubricant is more than 7 vol %, the occupying amount of the solid lubricant in the raw material powder 1' becomes too large, and consequently it becomes difficult to obtain the compact 5 having a high density and the powder magnetic core 6. Thus, in the case of compression molding into the compact 5 through use of the raw material powder 1' containing a solid lubricant, it is desired that the raw material powder 1' containing 0.3 to 7 vol % of a solid lubricant be used, with the balance being the powder for a magnetic core 1.

In the above-mentioned configuration, as illustrated in FIG. 2a and FIG. 2b, the raw material powder 1' was filled into the cavity of the molding die, and then subjected to compression molding into the compact 5 by relatively moving the punch 13 so as to be close to the die 12. The molding pressure is set to a pressure at which the contact area between the powders for a magnetic core 1 adjacent to each other can be increased, for example, 600 MPa or more, more preferably 800 MPa or more. Thus, as schematically illustrated in FIG. 3a, the compact 5 having a high density in which the powders for a magnetic core 1 are in strong contact with each other is obtained. Note that, in the case where the molding pressure is too high (for example, in the case where the molding pressure is more than 2,000 MPa), the insulating coating film 3 is damaged or the like to have its insulating property decreased, in addition to a decrease in durability life of the molding die. Thus, it is desired that the molding pressure be set to 600 MPa or more and 2,000 MPa or less.

[Heating Step]

In a heating step, the compact 5 in an atmosphere of inert gas (for example, nitrogen gas) or under a vacuum is heated at a temperature equal to or more than the recrystallization temperature and equal to or less than the melting point of the soft magnetic metal powder 2 (annealing treatment). Thus, the powder magnetic core 6 having a high density (see FIG. 3*b*) from which a strain (crystal strain) accumulated in the soft magnetic metal powder 2 has been appropriately removed, specifically, the powder magnetic core 6 having a relative density of 93% or more is obtained. In the case of using a pure iron powder as the soft magnetic metal powder 2, the strain can be removed properly by performing heating treatment at 650° C. or more for a predetermined period of time. Herein, the heating treatment with respect to the compact 5 is performed at 700° C. for 1 hour. However, as described above, the decomposition temperature of the crystals 4 forming the insulating coating film 3 is about 700° C. or more. Therefore, the situation in which the insulating coating film 3 is damaged, decomposed, peeled, and the like along with the heating treatment performed with respect to the compact 5 in the above-mentioned embodiment is prevented as much as possible.

In addition, the strain accumulated in the soft magnetic metal powder 2 is properly removed from the powder magnetic core 6 obtained by performing the above-mentioned heating treatment, and the powder magnetic core 6 becomes excellent in magnetic characteristics. Specifically, the powder magnetic core 6 can be obtained in which the magnetic flux density is 1.55 T or more and the maximum magnetic permeability is 600 or more in an environment of a DC magnetic field of 10,000 A/m, and the iron loss is less than 130 W/kg under the condition of a frequency of 1,000 Hz/a magnetic flux density of 1T in an AC magnetic field.

Further, when heating treatment is performed at the above-mentioned heating temperature, each crystal 4 forming the insulating coating film 3 is bonded to the adjacent crystal 4 through a condensation reaction, simultaneously with the removal of the strain accumulated in the soft magnetic metal powder 2. Therefore, the powder magnetic core 6 with mechanical strength and chipping resistance enhanced sufficiently can be obtained. Specifically, the powder magnetic core 6 having a radial crushing strength of 440 N or more and a rattler measured value, which is an indicator of chipping resistance, of less than 0.1% can be obtained.

Figure 4:
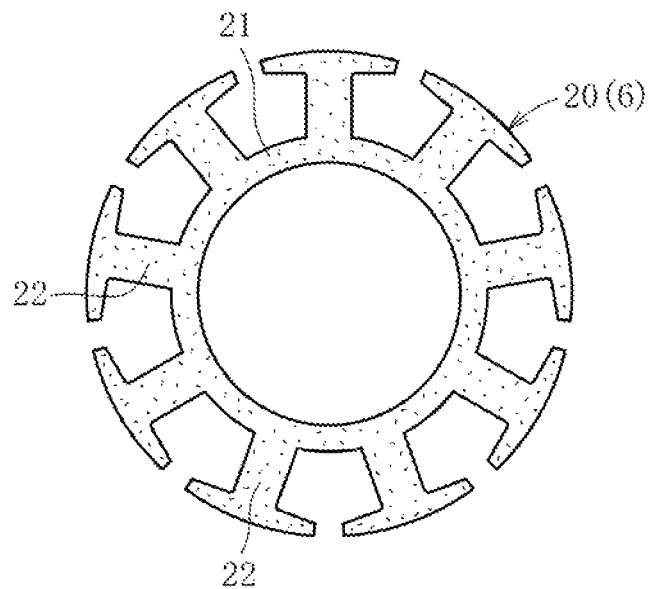
FIG. 4 is a plan view of a stator core as an example of the powder magnetic core.

The powder magnetic core 6 obtained as described above has sufficiently enhanced various strengths such as mechanical strength and chipping resistance in addition to the magnetic characteristics, as described above. Therefore, the powder magnetic core 6 can be preferably used as motors for vehicles having a high rotation speed and a high acceleration and being exposed to vibration constantly, such as automobiles and railroad vehicles, and as magnetic cores of components for power source circuits, such as a choke coil, a power inductor, and a reactor. Specifically, the powder magnetic core 6 according to the present invention can be used as the stator core 20 as illustrated in FIG. 4. The stator core 20 illustrated in FIG. 4 is used by being integrated, for example, with a base member forming a stationary side of various motors, and includes a cylindrical portion 21 having an attachment surface with respect to the base member and a plurality of protrusions 22 extending radially from the cylindrical portion 21 to the outside in a radial direction, a coil (not shown) being wound around the outer circumference of the protrusions 22. The powder magnetic core 6 has a high degree of freedom of a shape, and hence even the stator core 20 having a complicated shape as illustrated in FIG. 4 can be easily mass-produced.

In the foregoing, the powder for a magnetic core 1 according to the embodiment of the present invention and the powder magnetic core 6 produced through use of the powder for a magnetic core 1 have been described. However, the powder for a magnetic core 1 and the powder magnetic core 6 can be appropriately modified within the range not departing from the spirit of the present invention.

For example, the insulating coating film 3 covering the surface of the soft magnetic metal powder 2 can be formed of an aggregate of the crystals 4 obtained by cleaving, in particular, the swellable smectite-group mineral out of the swellable layered clay minerals, in which at least part of a hydroxyl group at the end (end face) thereof is substituted by a fluoro group.

The fluoro group has a high electronegativity as compared to that of the hydroxyl group, and hence the crystals 4 in which at least part of the hydroxyl group is substituted by the fluoro group as described above has a positive charge at the end (end face) thereof weakened. Therefore, when the crystals 4 are deposited on the surface of the soft magnetic metal powder 2, the repulsive force between the adjacent crystals 4 can be suppressed, and hence it becomes easy to form the dense insulating coating film 3 in which gaps between the adjacent crystals 4, 4 are small (crystals 4 are close-packed). When the insulating coating film 3 is rendered dense, the insulating coating film 3 is hardly damaged, peeled, or the like in the case where the powder for a magnetic core 1 (raw material powder 1') is subjected to compression molding, which is advantageous for obtaining the powder magnetic core 6 having a small eddy current loss. Note that, the ion radius of the fluoro group is larger than that of the hydroxyl group, and hence it becomes difficult to render the insulating coating film 3 dense owing to the influence of steric hindrance when the substitution amount of the hydroxyl group by the fluoro group is too large. On the other hand, even when the substitution amount is too small, a positive charge of a crystal end cannot be weakened sufficiently, and hence it becomes difficult to obtain the dense insulating coating film 3 in which the crystals 4 are close-packed. From such viewpoint, in the case of using the crystals 4 in which at least part of the hydroxyl group at an end is substituted by the fluoro group, it is preferred to use the crystals 4 in which the substitution amount of the hydroxyl group by the fluoro group is set to 0.05 mol or more and 0.3 mol or less when the content of silicon in the crystal is defined as 1 mol.

Further, the insulating coating film 3 can also be formed of an aggregate of the crystals 4 obtained by cleaving, in particular, the swellable smectite-group mineral out of the swellable layered clay minerals, and having a structure in which a hydroxyl group at an end (end face) thereof is condensed with a metal alkoxide.

When the crystals 4 are deposited on the surface of the soft magnetic metal powder 2, gaps formed between the adjacent crystals 4 can be reduced in size, and hence the insulating coating film 3 with a dense structure can be obtained. Therefore, with the powder for a magnetic core 1 having the insulating coating film 3, the powder magnetic core 6 can be obtained in which an eddy current can be prevented from flowing between adjacent particles as much as possible, that is, an eddy current loss is small. Examples of the metal alkoxide that may be used may include $Si(OR)_4$, $Al(OR)_4$, and $B(OR)_4$.

Further, the insulating coating film 3 can also be formed of an aggregate obtained by cleaving, in particular, the swellable smectite-group mineral out of the swellable layered clay minerals, in which at least part of an end (end face) of the crystals 4 has an anion bonded thereto.

The crystals 4 forming the swellable layered clay mineral generally have a weak positive charge at an end thereof, and hence the electric neutrality of the crystals is enhanced when at least part of the end of the crystals 4 has an anion bonded thereto. Thus, when the crystals 4 are deposited on the surface of the soft magnetic metal powder 2, the adjacent crystals 4 can be prevented from repelling each other, and hence the dense insulating coating film 3 can be formed easily. Note that, examples of the anion to be bonded to the end of the crystals 4 include a sulfide ion, a nitrate ion, a tetrasodium pyrophosphate ion, and a sodium silicate ion as well as a highly-concentration phosphate, a glycol, and a nonionic surfactant.

Further, the insulating coating film 3 can be formed so as to contain a zirconium compound. Thus, the insulating coating film 3 further excellent in heat resistance can be obtained. Examples of the zirconium compound that may be used include zirconia ($ZrO_2$), zircon ($ZrSiO_4$), and a zirconium organic metal compound.

Figure 5:
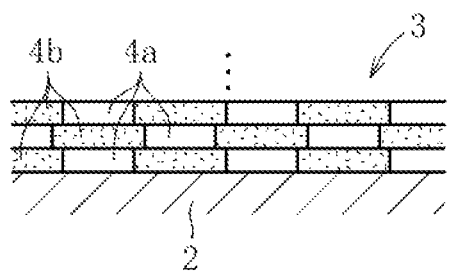
FIG. 5 is a view schematically illustrating a state in which an insulating coating film according to another embodiment is being formed.

Further, the insulating coating film 3 not only can be formed of an aggregate of one kind of the crystals 4, but also can be formed of an aggregate of a plurality of kinds (two kinds in the illustrated example) of crystals having different aspect ratios (=length/thickness) as illustrated in FIG. 5. Description is made in more detail. The insulating coating film 3 illustrated in FIG. 5 contains a mixture of first crystals 4a each having a relatively small aspect ratio and second crystals 4b each having a relatively large aspect ratio. As the first crystals 4a, for example, those obtained by cleaving hectorite, which is one kind of swellable smectite-group mineral, can be used. As the second crystals 4b, for example, those obtained by cleaving saponite, which is one kind of swellable smectite-group mineral similarly to hectorite, can be used. That is, the crystals forming hectorite each have a length of 40 nm and a thickness of 1 nm (aspect ratio: 40). The crystals forming saponite each have a length of 50 nm and a thickness of 1 nm (aspect ratio: 50). In this case, the first crystals 4a each having a relatively small aspect ratio are arranged so as to fill gaps between the second crystals 4b, 4b each having a relatively large aspect ratio. As a result, it is considered that the first and second crystals 4a, 4b are arranged regularly (to some degree) as illustrated in FIG. 5. Therefore, the dense insulating coating film 3 having a small gap between adjacent crystals can be obtained. Note that, in order to obtain the dense insulating coating film 3, the blending ratios of the respective crystals 4a, 4b (hectorite and saponite) in the solution 11 containing materials (first and second crystals 4a, 4b) for forming the insulating coating film 3 are important. In the configuration of this embodiment, it is preferred to use the solution 11 in which the blending ratios of hectorite and saponite are from 25 to 75% by mass and from 75 to 25% by mass, respectively, and it is particularly preferred to use the solution 11 in which the blending ratios of hectorite and saponite are equal (solution 11 containing each of hectorite and saponite at 50% by mass).

In the foregoing, as the material for forming the insulating coating film 3, the swellable layered clay mineral in which the crystals 4 of a silicate are laminated, out of the layered oxides, is used. However, as the material for forming the insulating coating film 3, for example, a layered titanic acid compound in which crystals of titanium oxide having insulating property are laminated can also be used.

Further, in the compression molding into the compact 5, die lubrication may be performed. Thus, the friction force between the inner wall surface of the molding die and the raw material powder 1' (powder for a magnetic core 1) is reduced, and hence the compact 5 can be rendered dense further easily. The die lubrication can be performed, for example, by applying a lubricant such as zinc stearate to an inner wall surface of a molding die, or by subjecting an inner wall surface of a molding die to surface treatment and covering the inner wall surface with a lubricant coating film.

EXAMPLES

In order to verify the usefulness of the present invention, ring-shape test pieces having the configuration of the present invention (Examples 1 to 22) and ring-shaped test pieces not having the configuration of the present invention (Comparative Examples 1 to 3) were subjected to confirmation tests for measuring and calculating the following evaluation items: (1) density; (2) electric resistivity of an insulating coating film; (3) electric resistivity of a ring-shaped test piece itself; (4) magnetic flux density; (5) maximum magnetic permeability; (6) iron loss; (7) radial crushing strength; and (8) rattler value, and were evaluated for the respective items (1) to (8) based on the test results. Note that, of the evaluation items (1) to (8), the evaluations for (6) iron loss and (7) radial crushing strength were performed on a six-point scale, and the evaluations for the remaining items were performed on a four-point scale. Then, the performance of each ring-shaped test piece was evaluated by a total value (total score) of evaluation points of the items (4) to (6) as indicators of magnetic characteristics and the items (7) and (8) as indicators of strength. Hereinafter, first, a method for measurement and calculation of the evaluation items (1) to (8) and evaluation points thereof are described in detail.

(1) Density

The size and weight of each ring-shaped test piece were measured, and the density thereof was calculated from the measurement results. The following evaluation points were given to the ring-shaped test piece in accordance with the calculated values.

4 points: 7.6 $g/cm^3$ or more
3 points: 7.5 $g/cm^3$ or more and less than 7.6 $g/cm^3$
2 points: 7.4 $g/cm^3$ or more and less than 7.5 $g/cm^3$
1 point: less than 7.4 $g/cm^3$ (2) Electric Resistivity of Insulating Coating Film An insulating coating film was formed on the surface of an iron plate having dimensions of 50 mm long×50 mm wide×5 mm high by the same procedure as that for forming an insulating coating film on a powder for a magnetic core to be used in production of a ring-shaped test piece, and the electric resistivity of the insulating coating film was measured with a resistivity meter (Hiresta UP/Loresta GP manufactured by Mitsubishi Chemical Analytech Co., Ltd.). The purpose of this is to measure the electric resistivity of an insulating coating film itself correctly. The following evaluation points were given to each insulating coating film in accordance with the measured value. Note that, each insulating coating film was not subjected to heating treatment.

4 points: $10^{10}$ Ω·cm or more 3 points: 105 Ω·cm or more and less than $10^{10}$ Ω·cm
2 points: 1 Ω·cm or more and less than $10^5$ Ω·cm
1 point: less than 1 Ω·cm (3) Electric Resistivity of Ring-Shaped Test Piece The electric resistivity of each ring-shaped test piece was measured with a resistivity meter (Hiresta UP/Loresta GP manufactured by Mitsubishi Chemical Analytech Co., Ltd.). The following evaluation points were given to each ring-shaped test piece in accordance with the measured value.
4 points: $10^2$ Ω·cm or more
3 points: 10 Ω·cm or more and less than $10^2$ Ω·cm
2 points: $10^{-2}$ Ω·cm or more and less than 10 Ω·cm
1 point: less than $10^{-2}$ Ω·cm (4) Magnetic Flux Density The magnetic flux density [T] at a magnetic field of 10,000 A/m was measured with a DC B-H measurement unit (SK-110 type manufactured by Metron Inc.). The following evaluation points were given in accordance with the measured value.
4 points: 1.65 T or more
3 points: 1.60 T or more and less than 1.65 T
2 points: 1.55 T or more and less than 1.60 T
1 point: less than 1.55 T (5) Maximum Magnetic Permeability The maximum magnetic permeability at a magnetic field of 10,000 A/m was measured with a DC B-H measurement unit (SK-110 type manufactured by Metron Inc.). The following evaluation points were given in accordance with the measured value.
4 points: 1,000 or more
3 points: 800 or more and less than 1,000
2 points: 600 or more and less than 800
1 point: less than 600

(6) Iron Loss

The iron loss [W/kg] at a frequency of 1,000 Hz was measured with an AC B-H measurement unit (B-H analyzer SY-8218 manufactured by Iwatsu Test Instruments Corporation). The following evaluation points were given in accordance with the measured value.
6 points: less than 90 W/kg
5 points: 90 W/kg or more and less than 100 W/kg
4 points: 100 W/kg or more and less than 110 W/kg
3 points: 110 W/kg or more and less than 120 W/kg
2 points: 120 W/kg or more and less than 130 W/kg
1 point: 130 W/kg or more

(07) Radial Crushing Strength

A compression force (compression speed: 1.0 mm/min) in a reduced diameter direction was applied to an outer circumferential surface of each ring-shaped test piece through use of a precision universal testing machine Autograph manufactured by Shimadzu Co., Ltd., and a compression force at a time when the ring-shaped test piece was broken was defined as radial crushing strength [N]. The following evaluation points were given in accordance with the calculated value.
6 points: 680 N or more
5 points: 600 N or more and less than 680 N
4 points: 520 N or more and less than 600 N
3 points: 440 N or more and less than 520 N
2 points: 360 N or more and less than 440 N
1 point: less than 360 N (8) Rattler Value (Weight Reduction Ratio)

Compliant with "Rattler value measurement method for metal compact" stipulated under the specification JPMA P11-1992 of Japan Powder Metallurgy Association. Specifically, a ring-shaped test piece loaded into an activity wheel of a rattler measurement unit was rotated 1,000 times, and thereafter, the weight reduction ratio [%] of the ring-shaped test piece was calculated as a rattler value as an indicator of chipping resistance. The following evaluation points were given in accordance with the calculated value.
4 points: less than 0.04%
3 points: 0.04% or more and less than 0.06%
2 points: 0.06% or more and less than 0.1%
1 point: 0.1% or more Next, a method of producing a ring-shaped test piece according to Examples 1 to 22 is described.

Example 1

An atomized iron powder as a soft magnetic metal powder was produced and classified to obtain an atomized iron powder having a particle diameter of from 30 to 300 µm. Then, the iron powder was soaked in an aqueous solution containing 0.3 mass % of hydrophilic synthetic hectorite manufactured by Wako Pure Chemical Industries, Ltd. in which hectorite (crystals) was dispersed while being cleaved completely, and thereafter, the resultant was stirred for about 3 minutes while its foaming was prevented. Then, the procedure of discharge of the hectorite aqueous solution, washing with pure water, and heating (drying) at 80° C. for 24 hours in a vacuum thermostat chamber was performed to produce a powder for a magnetic core including the atomized iron powder and an insulating coating film having a thickness of 10 nm covering the surface of the atomized iron powder. Then, a raw material powder containing 2.1 vol % of zinc stearate as a solid lubricant, with the balance being the above-mentioned powder for a magnetic core, was loaded into a molding die, and molded at a molding pressure of 1,200 MPa into a ring-shaped compact having an outer diameter of 20.1 mm, an inner diameter of 12.8 mm, and a thickness of 7 mm. Finally, the ring-shaped compact was heated at 700° C. for 1 hour in a nitrogen atmosphere to obtain a ring-shaped test piece of Example 1. In Example 1, the size of each crystal (that is, crystal obtained by cleaving the hydrophilic synthetic hectorite) forming the insulating coating film is about 50 nm in length by 1 nm in thickness.

Example 2

An iron powder obtained in the same way as in Example 1 was soaked in an aqueous solution containing of 0.3 mass % of montmorillonite [trade name: Bengel A ("Bengel" is a trademark)] manufactured by Hojun Co., Ltd. in which montmorillonite (crystals) was dispersed while being cleaved completely, and thereafter, the resultant was stirred for about 3 minutes while its foaming was prevented. Then, the same procedure as that of Example 1 was performed to produce a powder for a magnetic core including an atomized iron powder and an insulating coating film having a thickness of 10 nm covering the surface of the atomized iron powder. Then, the same procedure (molding to heating treatment) as that of Example 1 was performed to provide a ring-shaped test piece of Example 2. Note that, in Example 2, the size of each crystal forming the insulating coating film is about 500 nm in length by 1 nm in thickness.

Example 3

An iron powder obtained in the same way as in Example 1 was soaked in an aqueous solution containing 0.3 mass % of hydrophilic synthetic mica manufactured by Wako Pure Chemical Industries, Ltd. in which mica (crystals) was dispersed while being cleaved completely, and thereafter, the resultant was stirred for about 3 minutes while its foaming was prevented. Then, the same procedure as that of Example 1 was performed to produce a powder for a magnetic core including an atomized iron powder and an insulating coating film having a thickness of 20 nm covering the surface of the atomized iron powder. Then, the same procedure (molding to heating treatment) as that of Example 1 was performed to provide a ring-shaped test piece of Example 3. Note that, in Example 3, the size of each crystal forming the insulating coating film is about 5,000 nm in length by 10 nm in thickness.

Example 4

An iron powder obtained in the same way as in Example 1 was soaked in an ethanol solution containing of 0.3 mass % of lipophilic smectite [trade name: LUCENTITE SPN (provided that "LUCENTITE" is a trademark)] manufactured by Co-op Chemical Co., Ltd. in which lipophilic smectite (crystals) was dispersed while being cleaved completely, and thereafter, the resultant was stirred for about 3 minutes while its foaming was prevented. Then, the procedure of discharge of the lipophilic smectite ethanol solution, washing with ethanol, and heating at 80° C. for 24 hours in a vacuum thermostat chamber was performed to produce a powder for a magnetic core including an atomized iron powder and an insulating coating film having a thickness of 20 nm covering the surface of the atomized iron powder. Then, the same procedure (molding to heating treatment) as that of Example 1 was performed to provide a ring-shaped test piece of Example 4. Note that, in Example 4, the size of each crystal forming the insulating coating film is about 50 nm in length by 1 nm in thickness.

Example 5

An iron powder obtained in the same way as in Example 1 was soaked in an aqueous solution containing 0.3 mass % of hydrophilic synthetic hectorite (same kind as that of Example 1) manufactured by Wako Pure Chemical Industries, Ltd. in which hectorite was dispersed while being cleaved completely, and thereafter the resultant was stirred for about 3 minutes while its foaming was prevented. Then, the procedure of discharge of the hectorite aqueous solution and heating at 80° C. for 24 hours in a vacuum thermostat chamber was performed (that is, "washing step with pure water" was omitted) to produce a powder for a magnetic core including an atomized iron powder and an insulating coating film having a thickness of 500 nm covering the surface of the atomized iron powder. Then, the same procedure (molding to heating treatment) as that of Example 1 was performed to provide a ring-shaped test piece of Example 5.

Example 6

A production procedure of a ring-shaped test piece of Example 6 was performed in conformance with Example 1. Note that, in Example 6, an electrolytic iron powder classified to a particle diameter of from 30 to 300 µm was used as a soft magnetic metal powder.

Example 7

An atomized iron powder as a soft magnetic metal powder was produced and classified to provide an atomized iron powder having a particle diameter of 300 µm or more. Then, the same procedure (production of a powder for a magnetic core to molding into a compact to heating treatment) as that of Example 1 was performed to provide a ring-shaped test piece of Example 7.

Example 8

A production procedure of a ring-shaped test piece of Example 8 was performed in conformance with Example 1. Note that, in Example 8, a raw material powder for molding into a compact in which the blending ratio of zinc stearate was 0.35 vol % was used.

Example 9

A production procedure of a ring-shaped test piece of Example 9 was performed in conformance with Example 1. Note that, in Example 9, a raw material powder for molding into a compact in which the blending ratio of zinc stearate was 7.0 vol % was used.

Example 10

A production procedure of a ring-shaped test piece of Example 10 was performed in conformance with Example 1. Note that, in Example 10, the molding pressure in the molding into a compact was set to 600 MPa.

Example 11

A production procedure of a ring-shaped test piece of Example 11 was performed in conformance with Example 1. Note that, in Example 11, the molding pressure in the molding into a compact was set to 800 MPa.

Example 12

A production procedure of a ring-shaped test piece of Example 12 was performed in conformance with Example 1. Note that, in Example 12, the conditions for heating treatment of a compact were 550° C.×1 hour.

Example 13

An iron powder obtained in the same way as in Example 1 was soaked in an aqueous solution containing of 0.3 mass % of hydrophilic synthetic hectorite [trade name: Laponite RD ("Laponite" is a trademark)] manufactured by Rockwood Additives Ltd. in which hectorite (crystals) was dispersed while being cleaved completely, and thereafter, the resultant was stirred for about 3 minutes while its foaming was prevented. Then, the same procedure as that of Example 1 was performed to produce a powder for a magnetic core including an atomized iron powder and an insulating coating film having a thickness of 10 nm covering the surface of the atomized iron powder. Then, the same procedure (molding to heating treatment) as that of Example 1 was performed to provide a ring-shaped test piece of Example 13. Note that, in Example 13, the size of each crystal forming the insulating coating film is about 25 nm in length by 1 nm in thickness.

Example 14

An iron powder obtained in the same way as in Example 1 was soaked in an aqueous solution containing of 0.3 mass % of hydrophilic synthetic hectorite [trade name: LUCEN- TITE SWF ("LUCENTITE" is a trademark)] manufactured by Co-op Chemical Co., Ltd. in which hectorite (crystals) was dispersed while being cleaved completely, and thereafter, the resultant was stirred for about 3 minutes while its foaming was prevented. Then, the same procedure as that of Example 1 was performed to produce a powder for a magnetic core including an atomized iron powder and an insulating coating film having a thickness of 10 nm covering the surface of the atomized iron powder. Then, the same procedure (molding to heating treatment) as that of Example 1 was performed to provide a ring-shaped test piece of Example 14. In Example 14, the crystals forming the insulating coating film each have a structure in which part of a hydroxyl group at an end (end face) was substituted by a fluoro group (substitution amount was about 0.3 mol when the content of silicon in the crystals was defined as 1 mol), and the size of each crystal was about 50 nm in length by 1 nm in thickness.

Example 15

An iron powder obtained in the same way as in Example 1 was soaked in an aqueous solution containing of 0.3 mass % of hydrophilic synthetic hectorite [trade name: Laponite B ("Laponite" is a trademark)] manufactured by Rockwood Additives Ltd. in which hectorite (crystals) was dispersed while being cleaved completely, and thereafter, the resultant was stirred for about 3 minutes while its foaming was prevented. Then, the same procedure as that of Example 1 was performed to produce a powder for a magnetic core including an atomized iron powder and an insulating coating film having a thickness of 10 nm covering the surface of the atomized iron powder. Then, the same procedure (molding to heating treatment) as that of Example 1 was performed to provide a ring-shaped test piece of Example 15. In Example 15, the crystals forming the insulating coating film each have a structure in which part of a hydroxyl group at an end (end face) was substituted by a fluoro group (substitution amount was about 0.1 mol when the content of silicon in the crystals was defined as 1 mol), and the size of each crystal were about 40 nm in length by 1 nm in thickness.

Example 16

An iron powder obtained in the same way as in Example 1 was soaked in a mixed aqueous solution obtained by mixing 0.1 mass % of tetraethoxysilane (manufactured by Wako Pure Chemical Industries, Ltd.) as a metal alkoxide into an aqueous solution containing 0.3 mass % of hydrophilic synthetic hectorite (same kind as that of Example 1) manufactured by Wako Pure Chemical Industries, Ltd. in which hectorite was dispersed while being completely cleaved, and thereafter, the resultant was stirred for about 3 minutes while its foaming was prevented. Then, the procedure of discharge of the mixed aqueous solution, washing with pure water, and heating (drying) at 80° C. for 24 hours in a vacuum thermostat chamber was performed to produce a powder for a magnetic core including an atomized iron powder and an insulating coating film having a thickness of 10 nm covering the surface of the atomized iron powder. After that, the same procedure (molding to heating treatment) as that of Example 1 was performed to provide a ring-shaped test piece of Example 16. In Example 16, crystals forming the insulating coating film each have a structure in which a hydroxyl group at an end is condensed with a metal alkoxide.

Example 17

The same procedure as that of Example 16 except for using, as an aqueous solution for soaking an iron powder obtained in the same way as in Example 1, a mixed aqueous solution obtained by mixing 0.3 mass % of sodium pyrophosphate (manufactured by Taihei Chemical Industrial Co., Ltd.) into an aqueous solution containing 0.3 mass % of hydrophilic synthetic hectorite (same kind as that of Example 1) manufactured by Wako Pure Chemical Industries, Ltd. in which hectorite was dispersed while being cleaved completely was performed to provide a ring-shaped test piece of Example 17. In Example 17, crystals forming the insulating coating film each have a structure in which at least part of an end has an anion bonded thereto.

Example 18

The same procedure as that of Example 16 except for using, as an aqueous solution for soaking an iron powder obtained in the same way as in Example 1, a mixed aqueous solution obtained by mixing 0.1 mass % of a zirconium dispersion (trade name: SZR-CW) manufactured by SAKAI CHEMICAL INDUSTRY CO., LTD. into an aqueous solution containing 0.3 mass % of hydrophilic synthetic hectorite (same kind as that of Example 1) manufactured by Wako Pure Chemical Industries, Ltd. in which hectorite was dispersed while being cleaved completely was performed to provide a ring-shaped test piece of Example 18. Thus, a powder for a magnetic core forming the test piece of Example 18 is formed in such a manner that the insulating coating film contains a zirconium compound.

Example 19

An iron powder obtained in the same way as in Example 1 was soaked in an aqueous solution containing 0.3 mass % of hydrophilic synthetic saponite [trade name: Sumecton SA ("Sumecton" is a trademark)] manufactured by Kunimine Industries Co., Ltd. in which saponite (crystals) was dispersed while being cleaved completely, and thereafter, the resultant was stirred for about 3 minutes while its foaming was prevented. Then, the same procedure as that of Example 1 was performed to produce a powder for a magnetic core including an atomized iron powder and an insulating coating film having a thickness of 10 nm covering the surface of the atomized iron powder. Then, the same procedure (molding to heating treatment) as that of Example 1 was performed to provide a ring-shaped test piece of Example 19.

Example 20

An iron powder obtained in the same way as in Example 1 was soaked in an aqueous solution in which crystals of 0.2 mass % of hydrophilic synthetic hectorite [trade name: Laponite B] manufactured by Rockwood Additives Ltd. and 0.2 mass % of hydrophilic synthetic saponite [trade name: Smecton SA] manufactured by Kunimine Industries Co., Ltd. were dispersed while being cleaved completely, and thereafter, the resultant was stirred for 3 minutes while its foaming was prevented. Then, the same procedure as that of Example 1 was performed to produce a powder for a magnetic core including an atomized iron powder and an insulating coating film having a thickness of 10 nm covering the surface the atomized iron powder (powder for a magnetic core having an insulating coating film in which each of the blending ratios of the crystals of hectorite and the crystals of saponite was 50%). After that, the same procedure (molding to heating treatment) as that of Example 1 was performed through use of the powder for a magnetic core to provide a ring-shaped test piece of Example 20.

Example 21

The same procedure as that of Example 20 except for using, as an aqueous solution for soaking an iron powder obtained in the same way as in Example 1, an aqueous solution in which crystals of 0.3 mass % of hydrophilic synthetic hectorite [trade name: Laponite B] manufactured by Rockwood Additives Ltd and 0.1 mass % of hydrophilic synthetic saponite [trade name: Smecton SA] manufactured by Kunimine Industrial Co., Ltd. were dispersed while being cleaved completely was performed to provide a ring-shaped test piece of Example 21. That is, each powder for a magnetic core forming the ring-shaped test piece has an insulating coating film in which the blending ratios of the crystals of hectorite and the crystals of saponite are 75% and 25%, respectively.

Example 22

The same procedure as that of Example 20 except for using, as an aqueous solution for soaking an iron powder obtained in the same way as in Example 1, an aqueous solution in which crystals of 0.1 mass % of hydrophilic synthetic hectorite [trade name: Laponite B] manufactured by Rockwood Additives Ltd. and 0.3 mass % of hydrophilic synthetic saponite [trade name: Smecton SA] manufactured by Kunimine Industrial Co., Ltd. were dispersed while being cleaved completely was performed to provide a ring-shaped test piece of Example 22. That is, each powder for a magnetic core forming the ring-shaped test piece has an insulating coating film in which the blending ratios of the crystals of hectorite and the crystals of saponite are 25% and 75%, respectively.

Finally, a method of producing a ring-shaped test piece according to Comparative Examples 1 to 3 is described.

Comparative Example 1

An iron powder obtained in the same way as in Example 1 was soaked in an aqueous solution containing 0.5 mass % of manganese phosphate hydrate, and thereafter, the resultant was stirred for about 10 minutes while its foaming was prevented. After that, the procedure of discharge of the manganese phosphate aqueous solution and heating (drying) at 80° C. for 24 hours in a vacuum thermostat chamber was performed to produce a powder for a magnetic core including an atomized iron powder and a manganese phosphate coating film (insulating coating film) having a thickness of 2,000 nm covering the surface of the atomized iron powder. Then, a ring-shaped test piece of Comparative Example 1 was obtained in the same way as in Example 1.

Comparative Example 2

An iron powder obtained in the same way as in Example 1 was soaked in an ethanol solution containing 0.5 mass % of titanium methoxide manufactured by Alfa Aesar, and thereafter, the resultant was stirred for about 2 minutes while its foaming was prevented. Then, the procedure of discharge of the titanium methoxide ethanol solution and heating (drying) at 80° C. for 24 hours in a vacuum thermostat chamber was performed to produce a powder for a magnetic core in which titanium (thickness: 2,000 nm) as a precursor of an insulating coating film adhered to the surface of the iron powder. Then, a ring-shaped test piece of Comparative Example 2 was obtained in the same way as in Example 1. Note that, titanium adhering to the surface of the iron powder became titanium oxide (insulating coating film) along with the heating treatment performed with respect to a compact.

Comparative Example 3

An iron powder obtained in the same way as in Example 1 was soaked in a solution in which a silicone resin was dissolved in an organic solvent, and thereafter, the resultant was dried to produce a powder for a magnetic core including an iron powder and a silicone coating film having a thickness of 5,000 nm covering the surface of the iron powder. Thereafter, a ring-shaped test piece of Comparative Example 3 was obtained in the same way as in Example 1.

Figure 6:
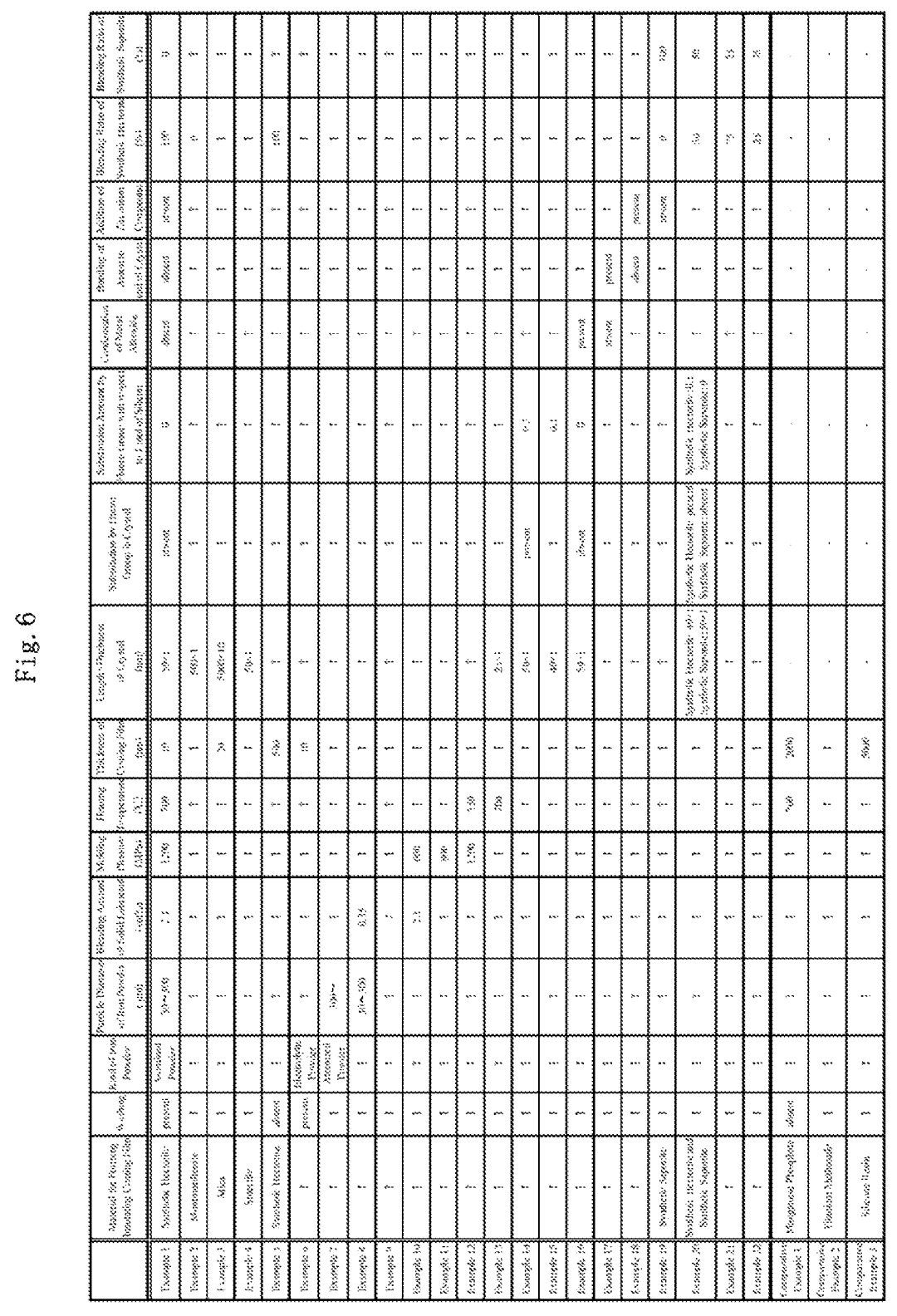

FIG. 6 shows a summary of the respective production methods of Examples 1 to 22 and Comparative Examples 1 to 3, and FIG. 7 shows evaluation points of (1) density, (2) electric resistivity of an insulating coating film, (3) electric resistivity of a ring-shaped test piece itself, (4) magnetic flux density, (5) maximum magnetic permeability, (6) iron loss, (7) radial crushing strength, and (8) rattler value in each of Examples and Comparative Examples, and total values of the evaluation points of the evaluation items (4) to (8). As apparent from FIG. 7, the total score in any of Examples 1 to 22 was higher than that of Comparative Examples 1 to 3. Of Examples 1 to 22, the total scores of Examples 1 to 4 were relatively high, and the total scores of Examples 13 to 22 were much higher. On the other hand, Comparative Examples 1 to 3 were all inferior to Examples in magnetic characteristics and strength, and the total scores of Comparative Examples 1 to 3 did not reach 10 points.

It is considered that the total scores (evaluations) of Examples 1 to 4 were relatively high for the following reasons (a) to (f).

(a) An atomized iron powder excellent in moldability is used.

(b) A metal powder having a particle diameter of from 30 to 300 μm is used.

(c) A raw material powder with an appropriate amount of a solid lubricant mixed therein is molded into a compact.

(d) The molding pressure of a compact is proper.

(e) The conditions for heating treatment of a compact are proper.

(f) The thickness of an insulating coating film is 20 nm or less.

In addition, the density of a compact was increased for the above-mentioned reasons (a), (c), (d), and (f), and as a result, the evaluation points of (4) magnetic flux density, (7) radial crushing strength, and (8) rattler value were enhanced. Further, it is considered that the above-mentioned reason (b) contributed to the reduction in (6) iron loss. Further, the reduction in coercive force and the enhancement of strength of an insulating coating film (compact) were achieved for the above-mentioned reason (e), and as a result, the evaluation points of (4) magnetic flux density, (5) maximum magnetic permeability, (6) iron loss, (7) radial crushing strength, and (8) rattler value were enhanced.

Further, it is considered that the total scores (evaluations) of Examples 13 to 22 were further increased respectively for the following reasons.

Example 13→An insulating coating film is formed of an aggregate of crystals each having a small length and a small thickness, out of crystals obtained by cleaving a swellable smectite-group mineral (synthetic hectorite).

Example 14→An insulating coating film is formed of an aggregate of crystals in which a hydroxyl group at an end face is substituted by a fluoro group.

Example 15→An insulating coating film is formed of an aggregate of crystals in which the substitution amount by a fluoro group is proper.

Example 16→An insulating coating film is formed of an aggregate of crystals in which a metal alkoxide is condensed with a hydroxyl group at an end face.

Example 17→An insulating coating film is formed of an aggregate of crystals in which an ion having a negative charge is bonded to an end face.

Example 18→An insulating coating film is formed so as to contain a zirconium compound.

Example 19→An insulating coating film is formed of an aggregate of crystals obtained by cleaving synthetic saponite, out of swellable smectite-group minerals.

Figure 8:
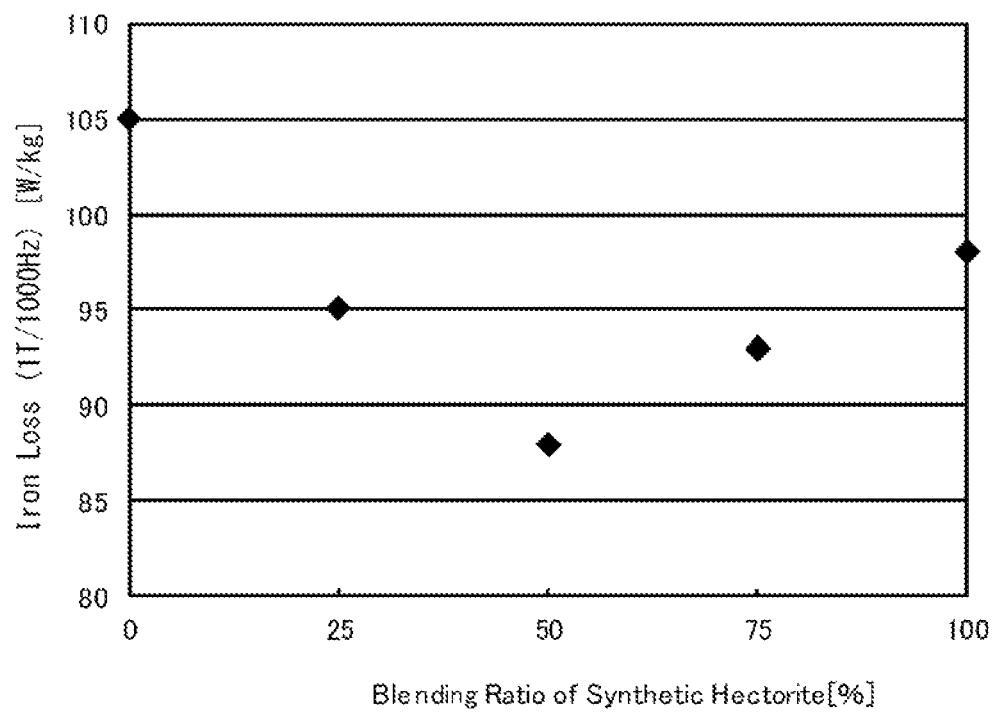
FIG. 8 is a graph showing test results of the confirmation test.

Examples 20 to 22→An insulating coating film is formed of an aggregate of crystals of synthetic hectorite and synthetic saponite, out of swellable smectite-group minerals. Note that, the evaluation point of Example 20 in which each of the blending ratios of synthetic hectorite and synthetic saponite, out of Examples 20 to 22, is 50% is highest because an iron loss can be suppressed most effectively in the case of adopting such blending ratio (see FIG. 8).

On the other hand, regarding Comparative Examples 1 to 3, the following is considered. First, in Comparative Examples 1 and 3, the heat resistance of an insulating coating film was low, and hence the insulating coating film was damaged and the like along with the heating treatment performed with respect to a compact, and as a result, an iron loss increased remarkably. Further, it is considered that the thickness of an insulating coating film was as large as 2,000 nm and 5,000 nm in Comparative Examples 1 and 3, respectively, and hence (1) density and (3) magnetic flux density were low, and (7) radial crushing strength and (8) rattler value were unsatisfactory. Next, in Comparative Example 2, it is considered that an insulating coating film was not able to be formed with good accuracy, and a powder for a magnetic core in which part of the surface of a metal powder was exposed to the outside was mixed, with the result that an eddy current was generated between powders and (5) iron loss increased. Further, it is considered that the thickness of the insulating coating film of Comparative Example 2 was large in the same way as in Comparative Example 1, and hence (1) density and (3) magnetic flux density were low, and (7) radial crushing strength and (8) rattler value were unsatisfactory.

It is verified from the foregoing confirmation test results that the powder for a magnetic core according to the present invention is very useful for obtaining a powder magnetic core excellent in magnetic characteristics and various strengths.

REFERENCE SIGNS LIST

1 powder for a magnetic core
1' raw material powder
2 soft magnetic metal powder
3 insulating coating film
4 crystal
5 compact
6 powder magnetic core
20 stator core

The invention claimed is:

1. A powder for a magnetic core, comprising:
a soft magnetic metal powder; and
an insulating coating film covering a surface of the soft magnetic metal powder,
wherein the insulating coating film is formed of an aggregate of crystals obtained by cleaving a layered oxide, and among the crystals constituting the aggregate, a crystal that is adjacent to the soft magnetic metal powder is ionically bonded to the soft magnetic metal powder, and other crystals are ionically bonded to adjacent crystals through metal cations.

2. The powder for a magnetic core according to claim 1, wherein the insulating coating film is formed of an aggregate of a plurality of kinds of the crystals having different aspect ratios, which are calculated by dividing a length by a thickness.

3. The powder for a magnetic core according to claim 1, wherein the crystals are obtained by cleaving a swellable layered clay mineral as the layered oxide.

4. The powder for a magnetic core according to claim 3, wherein the swellable layered clay mineral is a swellable smectite-group mineral or a swellable mica-group mineral.

5. The powder for a magnetic core according to claim 4, wherein the swellable smectite-group mineral comprises saponite.

6. The powder for a magnetic core according to claim 3, wherein the crystals are obtained by cleaving the swellable layered clay mineral, and at least part of a hydroxyl group at an end of the crystals is substituted by a fluoro group.

7. The powder for a magnetic core according to claim 6, wherein a substitution amount of the hydroxyl group by the fluoro group is 0.05 mol or more and 0.3 mol or less when a content of silicon in the crystals is defined as 1 mol.

8. The powder for a magnetic core according to claim 3, wherein the crystals are obtained by cleaving the swellable layered clay mineral and have a structure in which a hydroxyl group at an end of the crystals is condensed with metal alkoxide.

9. The powder for a magnetic core according to claim 3, wherein the crystals are obtained by cleaving the swellable layered clay mineral, and at least part of an end of the crystals has an anion bonded thereto.

10. The powder for a magnetic core according to claim 1, wherein the crystals each have a thickness of 1 nm or less and a length of 50 nm or less.

11. The powder for a magnetic core according to claim 1, wherein the insulating coating film further comprises a zirconium compound.

12. The powder for a magnetic core according to claim 1, wherein the soft magnetic metal powder is produced by an atomizing method.

13. The powder for a magnetic core according to claim 1, wherein the soft magnetic metal powder has a particle diameter of 30 μm or more and 300 μm or less.

14. The powder for a magnetic core according to claim 1, wherein the insulating coating film has a thickness of 1 nm or more and 500 nm or less.

15. A powder magnetic core, which is formed by heating a compact of raw material powder containing the powder for a magnetic core according to claim 1 as a main component.

16. The powder magnetic core according to claim 15, having a relative density of 93% or more.

17. The powder magnetic core according to claim 15, wherein the raw material powder comprises 0.3 to 7 vol % of a solid lubricant, with the balance being the powder for a magnetic core.

* * * * *